US006811585B2

(12) United States Patent  
Sakagami et al.

(10) Patent No.: US 6,811,585 B2  
(45) Date of Patent: Nov. 2, 2004

(54) OIL MIST FILTER

(75) Inventors: Takashi Sakagami, Hamakita (JP); Kenji Yano, Hamakita (JP)

(73) Assignee: Toyo Roki Seizo Kabushiki Kaisha, Shizuoka (JP)

( * ) Notice: Subject to any disclaimer, the term of this patent is extended or adjusted under 35 U.S.C. 154(b) by 0 days.

(21) Appl. No.: 10/221,214

(22) PCT Filed: Jan. 15, 2002

(86) PCT No.: PCT/JP02/00199
§ 371 (c)(1),
(2), (4) Date: Sep. 10, 2002

(87) PCT Pub. No.: WO02/055865
PCT Pub. Date: Jul. 18, 2002

(65) Prior Publication Data
US 2003/0037520 A1 Feb. 27, 2003

(30) Foreign Application Priority Data

Jan. 16, 2001 (JP) .......................................... P2001-8268

(51) Int. Cl.⁷ .......................... B01D 29/13; B01D 46/02
(52) U.S. Cl. .......................... 55/319; 55/332; 55/385.3; 55/482
(58) Field of Search .......................... 55/319, 320, 323, 55/327, 332, 333, 385.3, 482, 485, 502

(56) References Cited

U.S. PATENT DOCUMENTS

| 3,063,259 A | * | 11/1962 | Hankison et al. ............. 62/317 |
| 3,339,349 A | * | 9/1967 | Farnum .......................... 55/309 |
| 3,353,339 A | * | 11/1967 | Walter .......................... 96/137 |
| 3,546,853 A | * | 12/1970 | Claar .......................... 55/419 |
| 4,177,049 A | * | 12/1979 | Haslett, Jr. .................... 55/483 |
| 4,256,474 A | * | 3/1981 | Berger, Jr. et al. ............. 96/152 |
| 4,692,175 A | * | 9/1987 | Frantz .......................... 96/408 |
| 4,822,387 A | * | 4/1989 | Daniels ........................ 55/323 |
| 4,925,466 A | * | 5/1990 | Overby ........................ 55/319 |
| 5,039,323 A | * | 8/1991 | Ulitsky et al. ................ 55/320 |
| 5,296,134 A | * | 3/1994 | Zaiter ........................ 210/108 |
| 5,372,621 A | * | 12/1994 | Staton et al. ................. 96/408 |
| 5,385,592 A | * | 1/1995 | Maeda ......................... 55/323 |
| 5,409,514 A | * | 4/1995 | Ragusa et al. ................ 55/319 |
| 5,649,986 A | * | 7/1997 | Mueller ....................... 96/383 |
| 5,846,271 A | * | 12/1998 | Flynn et al. .................. 55/315 |
| 6,235,089 B1 | * | 5/2001 | Erdmannsdoerfer ........... 96/55 |
| 6,350,299 B1 | * | 2/2002 | Dekker et al. ................ 95/268 |
| 6,485,535 B1 | * | 11/2002 | Linnersten et al. ........... 55/319 |

FOREIGN PATENT DOCUMENTS

| JP | 52-066111 | 6/1977 |
| JP | 59-117810 | 8/1984 |
| JP | 4-129815 | 11/1992 |
| JP | 2000-187409 | 7/2000 |

OTHER PUBLICATIONS

Microfilm of the specification and drawings annexed to the request of Japanese Utility Model Application No. 45914/1991 (Laid-open No. 129815/1992) (Tokyo Roki Co., Ltd.), Nov. 27, 1992, Full text; all drawings (Family: none).

* cited by examiner

Primary Examiner—Robert H. Spitzer
(74) Attorney, Agent, or Firm—Young & Thompson

(57) ABSTRACT

An oil mist filter capable of removing oil mist and separating liquids of low viscosity. A filter section in the oil mist filter is of two-stage construction. The filter section includes a filter body disposed in the upper stage for arresting oil mist and a support body disposed in the lower stage to support the filter body and capable of separating gas fuel. A space is defined below the filter body. When passing through the filter body the oil mist in the gas fuel is arrested by the filter body. The liquid content in the gas fuel is collected below the filter body in the upper stage, and then moves under its own weight along the support body in the lower stage until it is collected in the space. The gas fuel having its liquid content removed is passed through the support body and fed to the engine.

4 Claims, 2 Drawing Sheets

OIL MIST FILTER

CROSS REFERENCE TO RELATED APPLICATION

This is the 35 USC 371 national stage of international application PCT/JP 02/00199 filed on Jan. 15, 2002 which designated the United States of America.

FIELD OF THE INVENTION

The present invention relates to an oil-mist filter for removing oil mist in a gaseous fuel, for example, utilized for an automobile using CNG (compressed natural gas) as gaseous fuel.

BACKGROUND OF THE INVENTION

In an automobile using CNG (compressed natural gas) as gaseous fuel, the CNG fills a bomb, as high-pressure gas, mounted to the automobile. Various impurities such as oil lubricating a compressor at a time of charging gas are dissolved in the CNG. The CNG in the bomb is highly pressurized, so that the CNG is reduced in pressure to a constant pressure value through a regulator (pressure reducing valve), and thereafter, the thus regulated CNG is supplied to an engine. In the process of reducing the pressure of the CNG through the regulator, there causes a phenomenon that oil mist dissolved in the CNG is precipitated in a fine foggy state. In order to eliminate an inconvenience that such oil mist adheres a valve portion or injector of the engine of the automobile when driven, an oil-mist filter is utilized.

In a conventional art, there is known an oil-mist filter such as one united with a regulator by being inserted directly into the regulator or one disposed in a duct arranged between the injector and the regulator and having an element therein.

SUMMARY OF THE INVENTION

The CNG is filled up with hydrocarbon such as propane, butane or the like for adjusting a quantity of heat at a low temperature time. Such hydrocarbon is seldom precipitated as a liquid component at the time of pressure reduction. In an oil-mist filter having a conventional structure, it is possible to remove the oil mist but impossible to separate the liquid component having low viscosity.

Moreover, since conventional oil-mist filter is formed by cutting a solid material, it has a heavy weight and it is difficult to be assembled, thus increasing a manufacturing cost. Furthermore, for the oil-mist filter disposed in a duct, it is required to independently install IN and OUT ducts, also providing a troublesome disadvantage.

Then, the present invention aims to provide an oil-mist filter capable of removing oilmist and separating liquid component having low viscosity.

Another object of the present invention is to provide an oil-mist filter having a light weight and improved assembling property and hence being manufactured at a reduced cost, Hereunder, the present invention will be described. Further, it is to be noted that in the following description, although reference numerals described on the drawings accompanied are added with parenthesis, the present invention should not be defined to one described in the drawings. In order to remove the oil mist as well as to separate the liquid component having low viscosity, the inventor conceived an oil-mist filter having an inner two-staged structure in which a fine oil mist is captured by an upper filter element and the upper stage is supported by a supporting member disposed at a lower stage, and the liquid having low viscosity generated at a time of pressure reduction is separated by forming a space below the filter element.

That is, the invention in order to achieve the above objects, is an oil-mist filter provided with a container (1) and a filter unit (8) disposed inside the container (1) so as to filtrate gaseous fuel, the filter unit (8) comprising:

a filter element (9) disposed at an upper stage of the container so as to capture an oil mist; and a support member (10), disposed at a lower stage of the container (1) below the filter element (9), which supports the filter element (9) and through which the gaseous fuel passes, wherein a space is formed below the filter element (9)

According to this invention, the oil mist contained in the gaseous fuel is captured by the filter element during the passing through the filter element disposed at the upper stage of the filter unit. The liquid component in the gaseous fuel is once reserved at the lower portion of the filter element disposed at the upper stage, then flows down along the support member at the lower stage by its weight and, thereafter, is stored in the space formed below the filter element. The gaseous fuel, from which the oil mist and the liquid component have been removed, passes through the support member and is supplied to the engine. Further, since the filter element disposed at the upper stage can be supported by the support member disposed at the lower stage without suspending it from the upper portion, a pressure proof strength can be properly ensured. Preferably, the support member (10) is provided, at an outer periphery thereof, with a substantially cylindrical punched plate (24) to which a number of punched holes 24a, - - -) are formed, the punched plate (24) having an outer diameter which is substantially coincident with an outer diameter of the filter element (9)

According to this invention, the liquid component in the gaseous fuel passing through the filter element flows along the outer periphery of the support member with high efficiency and is then stored in the space formed below the filter element. On the other hand, the gaseous fuel passing through the filter element is supplied to the engine through a number of punched holes formed to the support member.

The invention is, for achieving the above objects, an oil-mist filter provided with a bottomed cylindrical container (1) having one end, in an axial direction, opened, an end plate (2) provided at one end of the container (1) and formed with a gas flow-in port (3) and a gas flow-out port (4), and a filter unit (8) disposed inside the container (1) so as to filtrate a gaseous fuel, the container (1) being formed by press-forming a plate member, the filter unit (8) comprising: a filter element (9) disposed at an upper stage of the container (1) so as to capture an oil mist; and a support member (10), disposed at a lower stage of the container (1) below the filter element (9), which supports the filter element (9) and through which the gaseous fuel passes, wherein a space is formed below the filter element (9)

According to this invention, from the reason mentioned above, the oil mist can be removed and, as well, the liquid component having low viscosity can be separated. Furthermore, since the oil-mist filter can be formed as a disposal cartridge type as an existing oil filter for an engine, the oil-mist filter can be formed with light weight and with high assembling performance, thus being suitable for mass-production and capable of reducing cost. In addition, since the oil-mist filter can take an outer configuration similar to that of the existing oil filter, the oil-mist filter can be removed by using the same jig or tool as that used for the existing oil filter, thus improving maintenance performance. Still furthermore, since the oil-mist filter can be directly mounted to an intake manifold (spin-on structure), as the existing oil filter, at a portion near an injector for an engine of an automobile, for example, it is not necessary to arrange IN and Out ducts.

Furthermore, the invention is, for achieving the above objects, an oil-mist filter provided with a bottomed cylindrical container (1) having one end, in an axial direction, opened, an end plate (2) provided at one end of said container and formed with a gas flow-in port (3) and a gas flow-out port (4), and a filter unit (8) disposed inside the container so as to filtrate a gaseous fuel, the container (1) being formed from a resin material, the filter unit (8) comprising: a filter element (9) disposed at an upper stage of the container so as to capture an oil mist; and a support member (10), disposed at a lower stage of the container (1) below the filter element (9), which supports the filter element (9) and through which the gaseous fuel passes, wherein a space is formed below the filter element (9)

According to this invention, the oil mist can be removed by the reasons mentioned above, and in addition, the liquid component having low viscosity can be also separated. Moreover, the oil-mist filter can be constructed as a disposal cartridge type as like as an existing oil filter of an engine.

DESCRIPTION OF THE PREFERRED EMBODIMENTS

Figure 1:
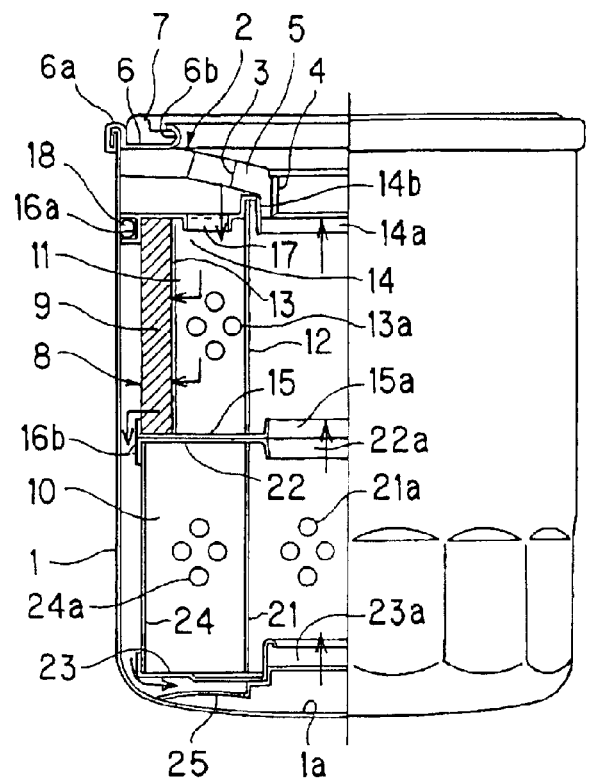
FIG. 1 is a side view (including a partial sectional view) showing an oil-mist filter according to a first embodiment of the present invention.

FIG. 1 shows an oil-mist filter according to the first embodiment of the present invention. This oil-mist filter is disposed on a downstream side of a regulator, i.e. low pressure side, and acts to remove oil mist, in a foggy state, precipitated at the time of reducing the pressure of CNG (compressed natural gas). The oil-mist filter comprises a bottomed cylindrical container 1 having an opening formed at an axial one end thereof and an end plate 2 disposed so as to close one (upper) end of the container 1 and formed with a gas flow-in port 3 and a gas flow-out port 4. The oil-mist filter has a shape similar to that of a known oil filter for filtrating oil.

The container 1 has a cylindrical structure having a bottom 1a and is formed from a plate member through a pressing working as a known oil filter. Further although not shown, the container 1 may be formed through an injection molding of synthetic resin material.

The end plate 2 is provided with a thickened disc plate 5 and a thin annular plate 6 welded to a peripheral edge portion of the thickened disc plate 5. The thickened disc plate 5 is formed with a central screw hole as a gas flow-out port 4, around which a plurality of gas flow-in ports 3, 3, - - - are formed. The thin annular plate 6 has a folded clamping portion 6a formed at its peripheral edge and an annular groove 6b formed inside thereof to support a packing 7, which is fitted into the annular groove 6b by pressing means, for example. The opened end of the container 1 and the folded clamping portion 6a of the thin annular plate 6 are fastened in an integrally folded state. The packing 7 is disposed for the purpose of sealing the gaseous fuel, at a time of mounting the oil-mist filter to the engine side, so as not to cause a gap between the oil-mist filter and the engine.

A filter unit 8, which filtrates the gaseous fuel, is provided inside the container 1. The filter unit 8 has a two-staged structure having an upper filter element 9 for capturing the oil mist and a lower support member 10 for supporting the upper filter element 9.

The filter element 9 has an approximately cylindrical shape and is composed of three sheets of filters which are piled on one another. The gaseous fuel passes the filter element 9 from the inside of the filter element 9 towards the outside thereof.

A holder member 11 is disposed around the inner periphery of the filter element 9 and the holder member 11 comprises a cylindrical inner peripheral plate 12, a cylindrical outer peripheral punched plate 13 arranged coaxially with the inner peripheral plate 12 and upper and lower end annular plates 14 and 15 closing upper and lower end portions of the space defined by the inner peripheral plate 12 and the outer peripheral punched plate 13.

The upper end annular plate 14 is formed with an inlet port 17 for the holder member so that the gaseous fuel flowing through the gas flow-in port 3 formed to the end plate 2 enters the holder member 11. There is disposed, to the outer periphery of the upper end annular plate 14, a packing 18 closely contacting the inner peripheral surface of the container 1 so as to prevent the gaseous fuel flowing through the gas flow-in port 3 from turning around the filter element 9. Furthermore, there is also formed, to the central portion of the upper end annular plate 14, a gas passing port 14a through which a gas after separating the oil mist and liquid component from the gaseous fuel passes, and around this gas passing port 14a, is formed a fitting portion 14b which is fitted to the outer periphery of the gas flow-out port 4 formed to the end plate 2. On the other hand, there is also formed a gas passing port 15a to the central portion of the lower end annular plate 15. Further, frame members 16a and 16b clamping the upper and lower end portions of the filter element 9 are formed to the peripheral edge portions of the upper end annular plate 14 and the lower end annular plate 15, respectively.

A number of holes 13a, 13a, - - - are punched out to an outer peripheral punched plate 13 so as to permit the gaseous fuel to pass therethrough.

The lower support member 10 supporting the upper filter element 9 has a cylindrical shape having a diameter substantially coincident with the outer diameter of the filter element 9. Center lines of the support member 10 and the holder member 11 are coincident with each other. The support member 10 comprises a cylindrical inner peripheral punched plate 21, a cylindrical outer peripheral punched plate 24 disposed coaxially with the inner peripheral punched plate 21 and upper and lower end annular plates 22 and 23 closing upper and lower end portions of a gap defined between the inner and outer peripheral punched plates 21 and 24.

The inner peripheral punched plate 21 of the support member 10 has a diameter equal to that of the inner peripheral plate 12 of the holder member 11. The outer peripheral punched plate 24 of the support member 10 has an outer diameter (diameter) substantially equal to that of the filter element 9. A number of holes 21a, 21a - - - and 24a, 24a, - - - are formed to both the inner and outer peripheral punched plates 21 and 24 so as to pass the gaseous fuel and carry out the gas/liquid separation. Further, gas passing holes 22a and 23a are formed to central portions of the upper and lower end annular plates 22 and 23, respectively, so as to pass the gaseous fuel. In this described embodiment, although the inner peripheral punched plate 21 is provided for the support member 10, such inner peripheral punched plate 21 may be eliminated as far as a structure for supporting the filter element 9 is adopted.

There is provided a space for storing liquid component in the gaseous fuel at a portion below the filter element 9 (i.e., a space inside the inner peripheral punched plate 21, a gap between the outer and inner peripheral punched plates 24 and 21, a gap between the outer peripheral punched plate 24 and the container 1, and a gap between the lower end annular plate 23 and the bottom 1a of the container 1). The axial length of the support member 10 is substantially equal to the axial length of the filter element 9 to thereby form a large space inside the container 1.

A pressing spring 25 is disposed between the support member 10 and the bottom 1a of the container 1. This pressing spring 25 comprises a leaf spring having an elasticity by which the support member 10 and the holder member 11 are urged upward, thereby engaging the fitting portion 14b of the holder member 11 with the outer periphery of the gas flow-out port 4 of the end plate 2 and, hence, the support member 10 and the holder member 11 are fixed to the inside of the container 1.

The oil-mist filter having the structure mentioned above is directly mounted to a surrounding of an injector, for example, intake manifold, of an automobile. The gaseous fuel first flows entirely into the container 1 through the gas flow-in port 3 formed to the end plate 2 as shown with arrows in FIG. 1, and then, flows into the holder member 11 through the gas flow-in port 17 for the holder member. The gaseous fuel passes, thereafter, the outer peripheral punched plate 13 of the holder member 11 and the filter element 9. The gaseous fuel passing through the filter element 9 is directed downward and passes a space between the outer peripheral punched plate 24 of the support member 10 and the container 1, and a portion of the thus flowing gaseous fuel turns around the bottom portion of the container 1. Further, the remaining gaseous fuel, which does not turn around the container bottom portion, passes the outer and inner peripheral punched plates 24 and 21 of the support member 10 in this order. Thereafter, the gaseous fuel passes the gas passing ports 23a and 22a formed to the support member 10 and the gas passing ports 15a and 14a of the support member 11 and is then discharged towards the engine through the gas flow-out port 4 formed to the end plate 2.

As mentioned before, various impurities such as oil are dissolved in the CNG. In addition, in order to adjust heat quantity at the low temperature time, propane, butane or the like may fill the CNG. When the CNG is reduced in pressure by the regulator, the oil mist is precipitated in a fine foggy state and the propane, butane or the like is also precipitated as a liquid component.

The oil mist in the gaseous fuel is captured by the filter element 9 during the passing through the filter element 9 disposed at the upper stage of the container 1. On the other hand, the liquid component in the gaseous fuel is once reserved to a lower portion of the filter element 9 and, thereafter, flows down by its self-weight along the outer periphery of the support member 10 disposed at the lower stage of the container 1 and is then stored in the space formed below the filter element 9. The gaseous fuel from which the oil mist and the liquid component are separated passes the holes 24a, - - - and 21a, - - - formed to the support member 10 and is then supplied to the engine. The liquid component stored in the space at the lower portion of the container 1 will be removed by periodically exchanging the oil-mist filter.

Furthermore, by constructing the oil-mist filter so as to have a structure similar to the known oil filter for filtrating oil, the oil-mist filter of the present invention can be made into a cartridge type which is disposal as an existing oil filter for engine oil. For this reason, the oil-mist filter of the present invention has light weight and is easily assembled, thus being suitable for mass-production and production cost can be reduced. In addition, the oil-mist filter of the present invention can provide an outer configuration similar to that of the existing oil filter for the engine oil, so that the oil-mist filter can be removed by using a jig or like which is usable for the conventional oil filter for the engine oil, thus improving the maintenance performance.

Figure 2:
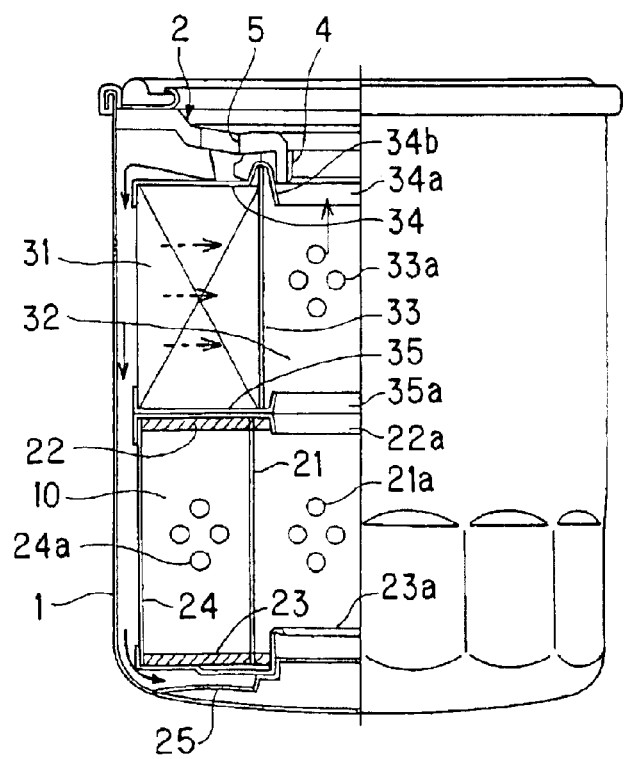
FIG. 2 is a side view (including a partial sectional view) showing an oil-mist filter according to a second embodiment of the present invention.

FIG. 2 is an oil-mist filter according to the second embodiment of the present invention. In this second embodiment, there is used a filter element 31 having cylindrical shape which is formed by bending or folding filter paper or non-woven fabric into zigzag shape so as to provide a number of gussets or like. The filter element 31 has upper and lower, as viewed, end portions to which seal members are formed by means of hot-melt, for example, for closing openings formed between the gussets. A gaseous fuel passes, different from the first embodiment, from the outside of the filter element 31 towards the inside thereof.

The filter element 31 is supported by a support member 32, which comprises an inner peripheral punched plate 33 fitted to the inner periphery of the filter element 31 and upper and lower end annular plates 34 and 35 clamping the upper and lower end portions of the filter element 31. A number of holes 33a, 33a, - - - are punched to the inner peripheral punched plate 33. Gas passing holes 34a and 35a are formed to central portions of the upper and lower end annular plates 34 and 35, respectively. Furthermore, the upper end annular plate 34 is formed with a fitting portion 34b fitted to an outer periphery of the gas flow-out port 4 of the end plate 2 of the oil-mist filter.

The structures of the container 1, the end plate 2, the support member 10 and the pressing spring 25 are substantially the same as those of the first embodiment, so that like reference numerals are added to corresponding portions and the explanations thereof are omitted herein.

In this embodiment, the gaseous fuel passes the filter element 31 from the outside thereof towards the inside thereof. Oil mist in the gaseous fuel is captured by the filter element 31. The filtrating efficiency can be enhanced by flowing the gaseous fuel through the filter element 31 from the outside thereof towards the inside thereof. On the other hand, the liquid component in the gaseous fuel is once reserved on the upper surface of the lower end annular plate 35, then flows down along the outer periphery of the support member 10 and is stored thereafter in the space formed below the filter element 31. A portion of the gaseous fuel from which the oil mist and the liquid component are removed passes through the holes 33a - - - of the inner peripheral punched plate 33 of the support member 32 and then flows outward through the gas flow-out port 4 formed to the end plate 2. The remaining gaseous fuel passes the punched holes 21a, - - - and 24a, - - - of the inner and outer peripheral punched plates 21 and 24 of the support member 10 in this order. Thereafter, the gaseous fuel passes the gas passing holes 22a, - - - and 23a, - - - formed to the support member 10 and is then discharged outward through the gas flow-out port 4 formed to the end plate 2.

Figure 3:
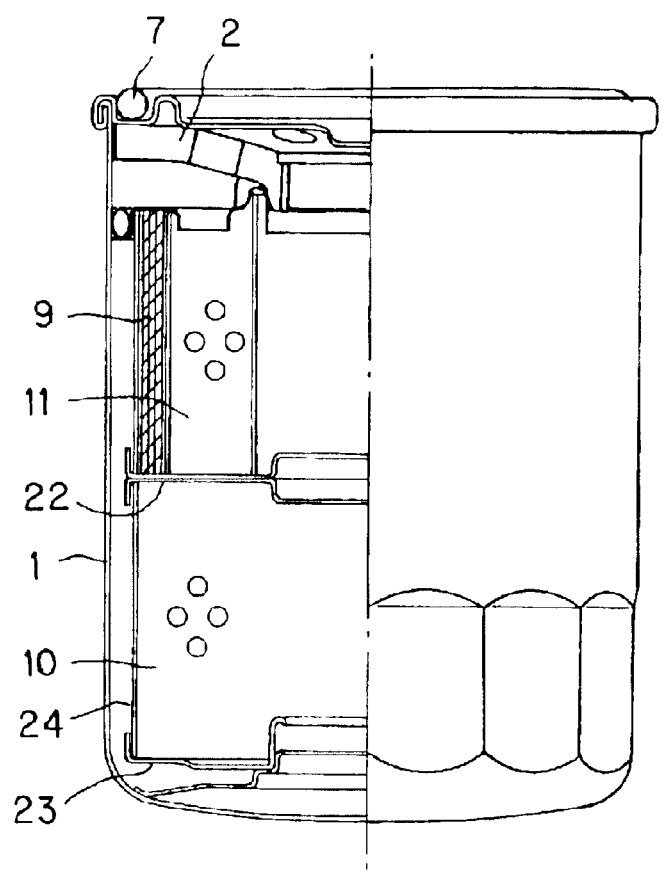
FIG. 3 is a side view (including a partial sectional view) showing an oil-mist filter according to a third embodiment of the present invention.

FIG. 3 shows an oil-mist filter according to the third embodiment of the present invention. The oil-mist filter of this embodiment has substantially the same structure as that of the first embodiment. Since the structures of the container 1, the end plate 2, the filter element 9 and the holder member 11 are the same as those of the first embodiment, the explanation thereof is omitted herein by adding the same reference numerals.

The oil-mist filter of this embodiment, which is different from the first embodiment, utilizes an O-ring for the packing 7 fitted to the end plate 2 to thereby increase pressure-proof ability. Further, the support member 10 is not provided with any inner peripheral punched plate. That is, the support member 10 is composed of the cylindrical outer peripheral punched plate 24 and the upper and lower end annular plates 22 and 23 disposed to the upper and lower end portion of the outer peripheral punched plate 24. In this structure in which the support member 10 is not provided with the inner peripheral punched plate, the strength sufficient for supporting the filter element and the durability can be also ensured.

As mentioned hereinbefore, according to the present invention, the filter unit which filtrates the gaseous fuel comprises a filter element, for capturing oil mist, disposed at an upper stage of the filter unit and a support member disposed at a lower stage of the filter element and adapted to support the filter element with a space below the filter element so as to pass the gaseous fuel. The oil mist in the gaseous fuel is captured during the passing through the filter element disposed at the upper stage of the filter unit, and on the other hand, the liquid component in the gaseous fuel is once reserved at the lower portion of the filter element, then flows down along the support member at the lower stage by its weight and, thereafter, is stored in the space formed below the filter element. The gaseous fuel, from which the oil mist and the liquid component are removed, passes through the support member and is supplied to the engine. Therefore, the oil mist can be removed and the liquid component having low viscosity can be also separated.

What is claimed is:

1. An oil-mist filter provided with a bottomed cylindrical container having one end, in an axial direction, opened, an end plate provided at one end of said container and formed with a gas flow-in port and a gas flow-out port, and a filter unit disposed inside the container so as to filtrate a gaseous fuel, said container being formed by press forming a plate member, said filter unit comprising: a filter element disposed at an upper stage of the container so as to capture an oil mist; and a support member, disposed at a lower stage of the container below the filter element, which supports the filter element and through which the gaseous fuel passes, wherein a space is formed below the filter element.

2. An oil-mist filter provided with a bottomed cylindrical container having one end, in an axial direction, opened, an end plate provided at one end of said container and formed with a gas flow-in port and a gas flow-out port, and a filter unit disposed inside the container so as to filtrate a gaseous fuel, said container being formed from a resin material, said filter unit comprising: a filter element disposed at an upper stage of the container so as to capture an oil mist; and a support member, disposed at a lower stage of the container below the filter element, which supports the filter element and through which the gaseous fuel passes, wherein a space is formed below the filter element.

3. An oil-mist filter provided with a bottomed cylindrical container having one end, in an axial direction, opened, an end plate provided at one end of said container and formed with a gas flow-in port and a gas flow-out port, and a filter unit disposed inside the container so as to filtrate gaseous fuel, said filter unit comprising:

a filter element disposed at an upper stage of the container so as to capture an oil mist; and a support member, disposed at a lower stage of the container below the filter element, which supports the filter element and through which the gaseous fuel passes, wherein a space is formed below the filter element.

4. An oil-mist filter provided with a container and a filter unit disposed inside the container so as to filtrate gaseous fuel, said filter unit comprising:

a filter element disposed at an upper stage of the container so as to capture an oil mist; and a support member, disposed at a lower stage of the container below the filter element, which supports the filter element and through which the gaseous fuel passes, wherein a space is formed below the filter element, and wherein said support member is provided, at an outer periphery thereof, with a substantially cylindrical punched plate to which a number of punched holes are formed, said punched plate having an outer diameter which is substantially coincident with an outer diameter of the filter element.

* * * * *